Nov. 14, 1967
E. G. BISKIS
3,352,121
REGENERATIVE ADSORPTION PROCESS
Filed March 3, 1965
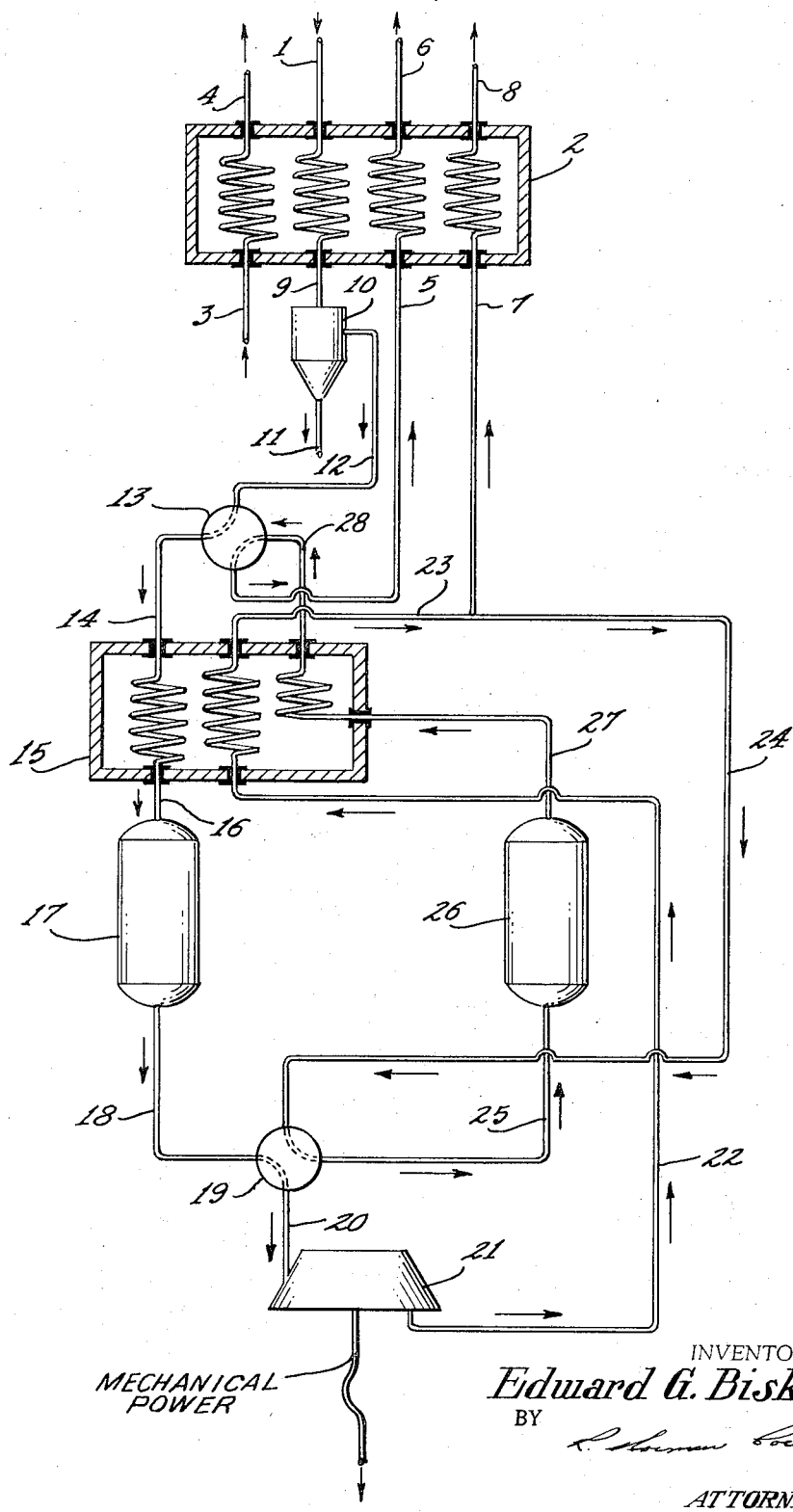
MECHANICAL POWER
INVENTOR.
*Edward G. Biskis*
BY
*ATTORNEY.*

United States Patent Office 3,352,121
Patented Nov. 14, 1967

3,352,121
REGENERATIVE ADSORPTION PROCESS
Edward G. Biskis, Emmaus, Pa., assignor to Air Products and Chemicals, Inc., Philadelphia, Pa., a corporation of Delaware
Filed Mar. 3, 1965, Ser. No. 436,835
3 Claims. (Cl. 62—18)

ABSTRACT OF THE DISCLOSURE

Purification of a gaseous mixture by fractionation and alternate regenerative adsorption is effected by initially cooling a pressurized high-temperature feed stream of the gaseous mixture by joint, indirect, heat-exchange with (1) combustion air, (2) fuel gas derived from adsorbent regeneration and (3) purified product; removing water from the cooled gaseous mixture; further cooling the mixture by joint, indirect, heat-exchange with said fuel gas and said purified product prior to their use in the first cooling stage; selectively adsorbing impurities from the twice-cooled gaseous mixture; expanding the purified effluent from the adsorber in an expansion engine for further cooling of the purified gas and incidental production of mechanical power; and withdrawing a minor fraction of the purified gas flowing between said cooling stages for regeneration of the adsorbent in the off-stream alternate adsorber. Though not limited thereto the disclosed exemplary application of the invention is directed to the purification of hydrogen.

---

This invention relates to a new and improved process for fractionating gaseous mixtures and more particularly, to a regenerative-adsorption method for removing one or more gaseous contaminants from a gas stream.

Many methods are known which employ adsorbents for the purification or enrichment of gaseous materials. In adsorption, contaminants, such as water vapor, organic solvents and/or other vapor phase impurities, are removed from a gas stream by concentration on the surface of a solid material which generally has been prepared to have a very large surface area per unit weight. The capacity of an adsorbent for a gaseous contaminant is a direct function of the contaminant's partial pressure and an inverse function of its temperature. Consequently, a contaminant can be desorbed from an adsorbent by lowering the contaminant's partial pressure in the system or raising the system's temperature. All regenerative-adsorption processes are based on one or both of these principles. However, conventional regenerative processes are complicated by their requirement for external sources of energy, purge gas or vacuum.

A process has now been discovered for fractionating gaseous mixtures which employs a unique temperature and pressure cycle to accomplish regenerative-adsorption without the need for external sources of energy, purge gas or vacuum. In the process of this invention, pressurized impure gas or vapor is refrigerated in a heat exchanger and flows into an adsorber where it is purified. The pure effluent from this adsorber, or a portion thereof, is expanded in an expansion engine or turbine to produce mechanical power. Chilled exhaust from the turbine provides refrigeration necessary to cool the impure gas feed stream. The heat exchanged, purified, low pressure product gas is collected except for a small fraction which is used to purge adsorbed impurities from a second adsorber. The adsorbers are switched periodically so that the impurities deposited in the adsorption phase of the cycle are removed in the desorption phase and thus permit the overall unit to operate in a continuous manner.

Since the process of the present invention neither requires nor utilizes external sources of energy, purge gas or vacuum, both size and complexity of the disclosed hybrid purifier can be greatly reduced as compared to conventional adsorber systems. The size of physical equipment required is also reduced since adsorption takes place at reduced temperatures, thereby minimizing the mass of adsorbent necessary to remove a given quantity of impurities from the gas stream.

One application of the described regenerative adsorption process is in the purification of hydrogen produced in small hydrocarbon stream reformer plants. A preferred embodiment of such as operation is shown schematically in the accompanying drawing.

In this embodiment impure reformer hydrogen at 1498° F. and 164.7 p.s.i.a. which has the following composition:

|  | Lb. mols per hour |
|---|---|
| $CH_4$ | 0.0192 |
| $CO_2$ | 0.1093 |
| $CO$ | 0.1462 |
| $H_2O$ | 0.4594 |
| $H_2$ | 0.6044 | is passed through line 1 into regenerator 2, where it is heat exchanged with combustion air (streams 3 and 4), fuel gas (streams 5 and 6) and purified hydrogen (streams 7 and 8). This regenerator chills the impure reformer hydrogen to 87° F. (line 9) thereby enabling a 99.2% recovery of its water content in water separator 10. Separated water from 10 may be discarded or recycled by means of line 11.

After passing through lines 12 and 14 and switch-valve 13, the impure reformer stream is further chilled in a switching heat exchanger 15 to approximately −70° F. This chilling reduces the stream's water dew point to about −70° F. and leaves a coating of liquid and solid water in the switching heat exchanger. The resulting dried, cooled reformer stream is passed directly along line 16 into adsorber 17 for removal of gaseous contaminants. Prior to introduction of the feed into the adsorption zone, the feed may be passed into a guard chamber (not shown) which will serve to remove materials that interfere with the main adsorption process. Accordingly, the guard chamber could contain an adsorbent material different from that present in the main adsorption bed. Purified hydrogen from the adsorber is transmitted to expansion engine 21 through lines 18 and 20 and switch-valve 19 where approximately 149 watts of mechanical power (75% efficiency) is obtained.

Pure, low pressure hydrogen effluent in line 22 is utilized to cool impure reformer hydrogen (line 14) in switching heat exchanger 15. Approximately 108 s.c.f.h. of 99.99% pure hydrogen (line 23) is recovered by means of lines 7 and 8. The remaining portion, passed through lines 24 and 25 and switch-valve 19, is utilized to regenerate adsorber 26. Fuel gas evolved in line 27 from adsorber 26 helps provide necessary refrigeration in switching heat exchanger 15 before passing through line 28 and switch-valve 13 into line 5 for suitable treatment depending upon its composition.

The adsorbers and switching heat exchanger passages are alternated periodically by reversing switch-valves 13 and 19. This periodic reversal regenerates the spent adsorbent and evaporates the water deposited in the switching heat exchanger during the previous half-cycle. It is contemplated, of course, that the switch-valves could be replaced with other valves such as a series of less expensive check-valves. Generally, time on the adsorption cycle in accordance with the present invention does not exceed three to four minutes and is preferably less than one minute. However, the particular time employed depends on operating varibles such as the particular adsorbent utilized, height and diameter of the adsorbent bed and nature of the gaseous contaminants.

While the invention has been described with particular reference to the purification of reformer hydrogen, the process is adaptable to many situations in which low concentrations of impurities are to be removed from gas or vapor streams, e.g., for gas purification, enrichment of the oxygen content of air, removal of methane from hydrogen, purification of sulfur hexafluoride, etc. As long as the impurity or contaminant is more strongly adsorbed than the desired gas constituents, the present invention may be advantageously employed. Typically, the process may be used to remove oxygen, nitrogen, argon, krypton, ammonia, water, carbon dioxide, carbon monoxide or hydrogen sulfide from helium and/or hydrogen; to remove hydrocarbon impurities such as methane, ethane, propane, butane, ethylene, propylene, butylene or higher hydrocarbons from hydrogen, helium, argon, neon, krypton, oxygen and/or nitrogen and to remove carbon dioxide, hydrogen sulfide, ammonia, water or sulfur dioxide from hydrogen, helium, nitrogen, argon, neon, krypton and/or oxygen.

The types of adsorbents which should be used for these purposes are well known to those skilled in the art. For example, activated char may be used for separating hydrogen from light hydrocarbons. On the other hand, in drying processes, silica gel would be advantageous. Alumina, ion oxide, glass wool, adsorbent cotton, clays, fuller's earth as well as naturally occurring and synthetic zeolites are illustrative of commonly employed adsorbents. The adsorbent material selected may be packed in a uniform or continuous manner throughout each adsorber vessel or such vessels may be packed with a number of different adsorbent materials, preferably arranged in layers or sections.

One method of reducing the loss of gas being purified is to carry out additional selective adsorptive separations on the impurity or desorbate gas stream. Each additional separation, of course, requires additional adsorbent-filled chambers, valves and the like and becomes increasingly expensive to construct and operate. However, there are instances where it is desirable to utilize as many as four to six additional adsorbers in series. Specifically, these are instances where the feed mixture contains a plurality of gaseous impurities.

Obviously, many modifications and variations of the invention as hereinbefore set forth may be made without departing from the spirit and scope thereof and therefore only such limitations should be imposed as are indicated in the appended claims.

What is claimed is:

1. A continuous regenerative-adsorptive method for removing gaseous contaminants from a pressurized, impure gas stream which comprises the steps of:
    (a) initially cooling the impure gas stream by indirect heat exchange with a plurality of gaseous coolants including purified product gas and gaseous effluent derived from the regeneration of adsorbent material;
    (b) removing condensed water from the cooled gas stream;
    (c) further cooling the cooled and dried gas stream by indirect heat exchange with said purified product gas and said gaseous regeneration effluent prior to their use in the initial cooling step (a);
    (d) passing the dry, cool, impure gas stream through adsorbent material for selective removal of gaseous contaminant;
    (e) expanding the purified gas in an expansion engine for further cooling of the gas and for incidental production of mechanical power;
    (f) subjecting all the thrice-cooled, purified, and expanded gas to heat exchange in said second cooling step (c);
    (g) subjecting the major portion of the purified gas from step (f) to heat exchange in said initial cooling step (a);
    (h) by-passing a minor portion of the purified gas from step (f) and utilizing the same for regenerating off-stream adsorbent material;
    (i) subjecting the gaseous effluent of regeneration in step (h) to successive heat exchange in steps (c) and (a);
    (j) and withdrawing the desired, purified gas after serving its cooling function in step (a).

2. The method of claim 1 in which said plurality of gaseous coolants in step (a) includes combustion air.

3. The method of claim 1 in which the impure gas stream is a moisture-containing, impure hydrogen gas stream.

References Cited
UNITED STATES PATENTS

| | | | |
|---|---|---|---|
| 2,337,474 | 12/1943 | Kornemann et al. | 62—18 X |
| 2,503,939 | 4/1950 | De Baufre | 62—18 X |
| 2,698,523 | 1/1955 | Hnilicka | 62—18 X |
| 2,944,627 | 7/1960 | Skarstrom | 55—62 X |
| 2,955,673 | 10/1960 | Kennedy et al. | 55—62 X |
| 3,011,589 | 12/1961 | Meyer | 62—18 X |

NORMAN YUDKOFF, *Primary Examiner.*

V. W. PRETKA, *Assistant Examiner.*